United States Patent
Marsden (10) Patent No.: US 12,355,225 B2
(45) Date of Patent: Jul. 8, 2025

(54) OUTLET COVER

(71) Applicant: Elbee Pty Ltd., Bondi Junction (AU)

(72) Inventor: Andrew Marsden, Hingham, MA (US)

(73) Assignee: Elbee Pty Ltd., Bondi Junction (AU)

( * ) Notice: Subject to any disclaimer, the term of this patent is extended or adjusted under 35 U.S.C. 154(b) by 198 days.

(21) Appl. No.: 18/335,083

(22) Filed: Jun. 14, 2023

(65) Prior Publication Data

US 2023/0411943 A1    Dec. 21, 2023

Related U.S. Application Data

(60) Provisional application No. 63/354,205, filed on Jun. 21, 2022.

(51) Int. Cl.
    *H02G 3/14*     (2006.01)
    *H01R 25/00*     (2006.01)
    *H02G 3/08*     (2006.01)

(52) U.S. Cl.
    CPC ............. *H02G 3/14* (2013.01); *H01R 25/006* (2013.01); *H02G 3/081* (2013.01)

(58) Field of Classification Search
    CPC ............ H02G 3/14; H02G 3/08; H02G 3/081; H01H 9/02; H01H 9/22; H01H 2009/0292; H01H 13/04; H01R 13/447; H01R 25/003; H01R 25/006; H01R 25/00; H01R 13/453; H01R 13/46
    USPC ........... 174/66, 67, 480, 481, 50, 53, 57, 58; 220/3.2–3.9, 4.02, 241, 242
    See application file for complete search history.

(56) References Cited

U.S. PATENT DOCUMENTS

| | | | | |
|---|---|---|---|---|
| 2,934,591 A | * | 4/1960 | Tiikkainen | H01R 13/4532 |
| | | | | 174/67 |
| 4,603,932 A | * | 8/1986 | Heverly | H01R 13/44 |
| | | | | 174/67 |
| 4,851,612 A | * | 7/1989 | Peckham | H01R 13/6395 |
| | | | | 174/67 |
| D308,626 S | | 6/1990 | Villarreal | |
| 4,950,842 A | * | 8/1990 | Menninga | H01R 13/447 |
| | | | | 174/67 |

(Continued)

OTHER PUBLICATIONS

[No Author Listed] Dreambaby Dual Fit Outlet Plug Cover—Model L907—Electrical Socket Guard for Standard and Decora (2 Pack) White. Amazon.com. https://www.amazon.com/Dreambaby-Electrical-2-Piece-Outlet-Cover/dp/B07CL2Z1XM?th=1. Publicly available at least as early as Apr. 29, 2022. 9 pages.

(Continued)

*Primary Examiner* — Angel R Estrada
(74) *Attorney, Agent, or Firm* — Wolf, Greenfield & Sacks, P.C.

(57) ABSTRACT

An outlet cover may include an integral cover plate and a housing. The integral cover plate may include a first outlet cutout, a second outlet cutout, a crossbeam separating the first outlet cutout from the second outlet cutout, a first mounting hole formed in a top portion of the integral cover plate, a second mounting hole formed in the crossbeam, and a third mounting hole formed in a bottom portion of the integral cover plate. The integral cover plate may be configured to be secured to either decorative or standard outlets with no additional hardware or components. The housing may be configured to releasably attach to the integral cover plate.

20 Claims, 5 Drawing Sheets

(56) References Cited

U.S. PATENT DOCUMENTS

| | | | | |
|---|---|---|---|---|
| 5,932,845 | A | * | 8/1999 | Lacy ........................ H02G 3/14 |
| | | | | 174/67 |
| 6,133,531 | A | * | 10/2000 | Hayduke ................ H02G 3/081 |
| | | | | 174/67 |
| D509,193 | S | | 9/2005 | Piedmont |
| 7,179,996 | B1 | * | 2/2007 | Britt ..................... H01R 13/447 |
| | | | | 174/67 |
| D556,143 | S | | 11/2007 | Ni |
| 7,598,452 | B1 | * | 10/2009 | Shotey ................. H01R 13/652 |
| | | | | 174/67 |
| 8,017,865 | B1 | * | 9/2011 | Baldwin .................. H02G 3/14 |
| | | | | 174/67 |
| 8,251,253 | B1 | * | 8/2012 | Cleghorn ................ H02G 3/14 |
| | | | | 174/67 |
| 8,816,201 | B1 | * | 8/2014 | Shotey .................... H02G 3/14 |
| | | | | 174/67 |
| D745,850 | S | | 12/2015 | Gretz |
| D783,542 | S | * | 4/2017 | Marsden .............. H01R 13/447 |
| | | | | D13/156 |
| D823,263 | S | | 7/2018 | Cyzen |
| D838,250 | S | | 1/2019 | Smith |
| D847,763 | S | | 5/2019 | Hirayama |
| D886,743 | S | | 6/2020 | Weber |
| 11,631,969 | B2 | | 4/2023 | Guthmiller |
| 2003/0024724 | A1 | | 2/2003 | Leifer |

OTHER PUBLICATIONS

U.S. Appl. No. 29/843,489, filed Jun. 21, 2022, Marsden.

\* cited by examiner

OUTLET COVER

RELATED APPLICATIONS

This application claims the benefit of priority under 35 U.S.C. § 119(e) to U.S. Provisional Application No. 63/354,205, filed on Jun. 21, 2022, which is herein incorporated by reference in its entirety.

FIELD

Disclosed embodiments are related to electrical outlet covers and related methods of use.

BACKGROUND

As a part of child-proofing a home outlet covers are often employed to protect children from accessing the outlet. Conventional outlet covers include plates with electrically insulated prongs that fit into the outlet holes. These outlet covers sit substantially flush with the outlet and typically are removed by using fingernails or an instrument to pull the outlet away from the outlet. Some other conventional outlet covers include a cover plate which fastens over an existing face plate suing screws.

SUMMARY

In some embodiments, an outlet cover includes an integral cover plate and a housing. The integral cover plate includes a first outlet cutout including a first base, a second base, and two sidewalls interconnecting the first base and the second base, where the second base has a length shorter than the first base. The integral cover plate also includes a second outlet cutout including a third base, a fourth base, and two sidewalls interconnecting the third base and the fourth base, where the fourth base has a length shorter than the third base. The integral cover plate also includes a crossbeam separating the first outlet cutout from the second outlet cutout, a first mounting hole formed in a top portion of the integral cover plate, a second mounting hole formed in the crossbeam, a third mounting hole formed in a bottom portion of the integral cover plate, and at least one latch configured to move between a disengaged position and an engaged position. The housing is configured to releasably attach to the integral cover plate, where the housing includes at least one receptacle configured to receive the at least one latch when the at least one latch is in the engaged position.

In some embodiments, a method of installing an integral cover plate is provided, where the integral cover plate includes a crossbeam separating a first outlet cutout from a second outlet cutout, a first mounting hole formed in a top portion of the integral cover plate, a second mounting hole formed in the crossbeam, and a third mounting hole formed in a bottom portion of the integral cover plate. The method may include determining if an existing outlet is a standard outlet or a decorative outlet. Upon determining the existing outlet is the standard outlet, the method may include removing a single fastener from an existing standard outlet face plate of the existing outlet, placing the integral cover plate on the existing standard outlet face plate, and installing the single fastener through the second mounting hole into the existing standard outlet face plate. Upon determining the existing outlet is the decorative outlet, the method may include removing a first fastener and a second fastener from an existing decorative outlet face plate of the existing outlet, placing the integral cover plate on the existing decorative outlet face plate, installing the first fastener through the first mounting hole into the existing decorative outlet face plate, and installing the second fastener through the third mounting hole into the existing decorative outlet face plate.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The inventors have appreciated that conventional outlet covers are provided in two varieties. First, prong-type outlet covers are employed and interface with the outlet socket itself. Prong-type outlet covers typically include a plate having two on-conductive prongs that are inserted into the holes of an outlet socket. Such outlet covers generally are secured by a friction fit, and block use of the outlet unless they are removed. As standard outlets have two outlet sockets, two such prong-type outlet covers are typically used. Second, box-type outlet covers are employed and interface with an outlet face plate. Such outlet covers typically include a cover plate that is configured to interface with the existing outlet face plate. Such cover face plates are configured to be specific to an outlet cover type. For example, standard outlet face plates and decorative (e.g., "decora") outlet face plates may each have different shapes and mounting holes which requires different hardware for the cover plate. The cover plates are typically fastened to the existing outlet face plate with one or more screws, and in some instances use the existing screws associated with the existing outlet face plate. The box-type outlet covers may allow plugs to be used with the outlets while the outlets are protected.

In view of the above, the inventor has appreciated the benefits of an outlet cover that is universal to all outlet types without additional hardware or adapters. Additionally, the inventor has appreciated the benefits of an outlet cover that allows an adult to easily access and use an outlet while inhibiting a child from accessing the outlet. The outlet cover may include a one-piece (e.g., integral) cover plate having cutouts for outlets that are compatible with both standard and decorative outlets. The one-piece cover plate may also include mounting holes compatible with existing fasteners of both standard and decorative outlets.

In some embodiments, an outlet cover includes an outlet cover plate. The outlet cover plate may be configured to be installed over an existing outlet face plate. In some embodiments, the outlet cover plate may be installed over the existing outlet cover face plate using one or more existing fasteners used to fasten the existing outlet face plate to the outlet. In other embodiments, separate fasteners may be employed, as the present disclosure is not so limited. The outlet cover plate may be configured to fit over both standard outlets and decorative outlets. To allow for interchangeability, the outlet cover plate may include mounting holes for either standard or decorative outlets. Additionally, the outlet cover plate may include hybrid outlet socket cutouts that engage with both standard and decorative outlet sockets to properly secure the outlet cover to the existing sockets regardless of their type (e.g., standard or decorative). In some embodiments, the outlet cover may be configured to bend to engage one of standard sockets or decorative sockets.

According to exemplary embodiments described herein, an outlet cover plate may be fastened over an existing outlet face plate with one or more fasteners. In some embodiment, a fastener may be a screw. In some embodiments, a fastener may be a standard fastener for a standardized outlet (e.g., 6-32 oval head screws having a length of ⅝16" or ½"). In other embodiments, any suitable fastener may be employed to replace the one or more existing fasteners, as the present disclosure is not so limited.

According to exemplary embodiments described herein, and outlet cover may be configured to retrofit to an existing outlet. That is, the outlet cover may be employed to cover an existing outlet including existing outlet sockets and an existing face plate. In some embodiments, an outlet cover of exemplary embodiments herein may employ existing mounting hardware. For example, screws used to secure an existing face plate to an outlet may be used to secure the outlet cover to the existing outlet. In some embodiments, an outlet cover may be installed over an existing outlet face plate. In other embodiments, a face plate may be removed, and the outlet cover of exemplary embodiments herein may replace the face plate. In some embodiments, separate hardware (e.g., fasteners such as screws, adhesive, etc.) may be employed to secure the outlet cover of exemplary embodiments herein to an existing outlet and/or face plate, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
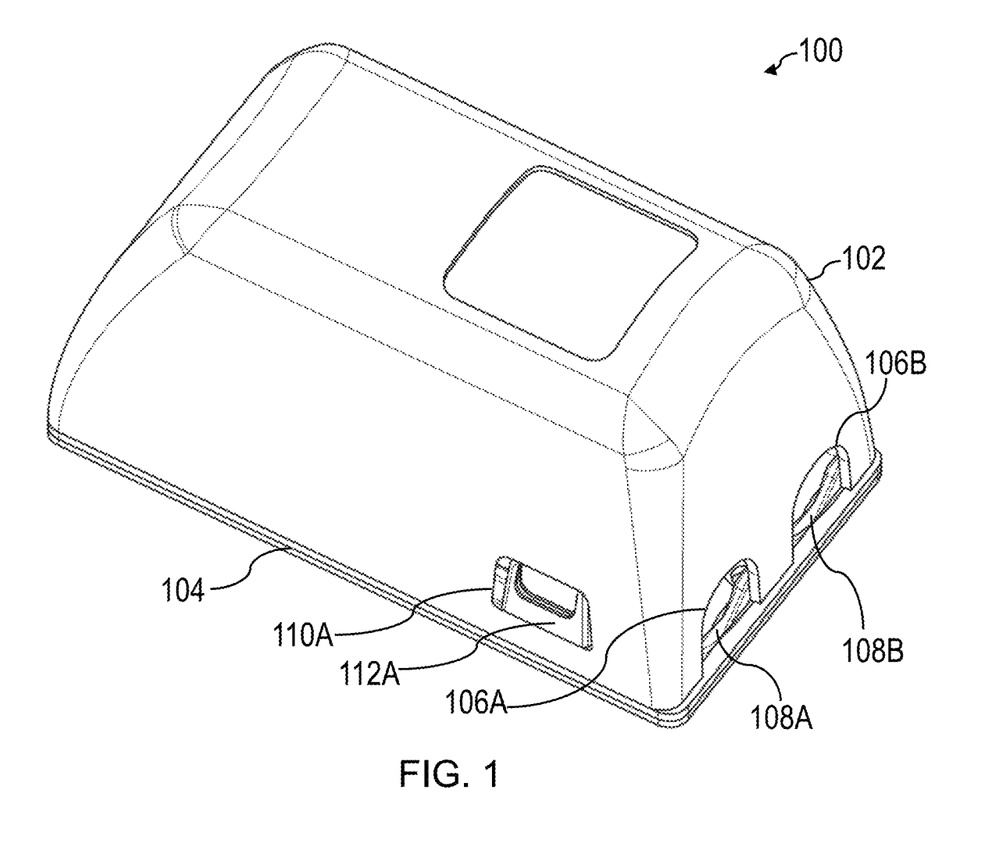
FIG. 1 is a perspective view of one embodiment of an outlet cover.

FIG. 1 is a perspective view of one embodiment of an outlet cover 100. The outlet cover 100 is configured to cover an existing outlet. In particular, the outlet cover 100 is configured to provide selective access to an outlet (e.g., for an adult) while inhibiting or preventing access to a child. The outlet cover 100 of FIG. 1 is configured to allow devices to remain plugged in at the outlet while inhibiting access to the outlet. In the state shown in FIG. 1, the outlet cover may inhibit access to the outlet. A user (e.g., an adult) may manipulate the outlet cover 100 to remove a portion of the outlet cover 100 to provide access to the outlet, as discussed further below.

As shown in FIG. 1, the outlet cover 100 includes a housing 102 and an integral cover plate 104. In some embodiments, the housing 102 and the integral cover plate 104 may be formed of plastic. In some embodiments, the housing 102 and the integral cover plate 104 may each be integrally molded. In some embodiments, the outlet cover 100 may only include the two pieces of the housing 102 and the integral cover plate 104. In other embodiments additional components may be included as part of an outlet cover, as the present disclosure is not so limited. As shown in FIG. 1, the housing 102 includes a first housing channel 106A and a second housing channel 106B. The first housing channel 106A and the second housing channel 106B are configured to accommodate power cables for devices that may be plugged into an outlet socket covered by the outlet cover 100. As shown in FIG. 1, the first housing channel 106A and the second housing channel 106B are aligned with a first cover channel 108A and a second cover channel 108B. Together, the housing channels and the cover channels form approximately circular holes through which device power cables may pass though. In some embodiments, the housing channels and the cover channels may be sized and shaped such that a power cable may pass through, but the plug itself may not pass through. Accordingly, when secured within an internal volume of the housing 102, a plug of an associated device may not be removable from the outlet cover without removing the housing 102.

According to the embodiment of FIG. 1, the housing 102 is releasably attached to the integral cover plate 104. The housing includes a first receptacle 110A (e.g., at least one receptacle). The integral cover plate 104 includes a first latch 112A (e.g., at least one latch). In some embodiments, the first latch 112A is configured to elastically flex between an engaged position and a disengaged position. In the engaged position, the first latch 112A is configured to engage the first receptacle 110A to secure the housing 102 to the integral cover plate 104. The first receptacle 110A may receive the first latch 112A when the first latch 112A is in the engaged position, such that the first receptacle 110A and the first latch 112A form an interference fit. In the disengaged position, the first latch 112A may disengage from and clear the first receptacle 110A to allow the housing to be removed from the integral cover plate 104. In some embodiments, the housing 102 may include two receptacles (e.g., a first receptacle 110A and a second receptacle). In some such embodiments, a second receptacle may be disposed opposite the first receptacle 110A. In some embodiments, the second receptacle may be a mirror of the first receptacle 110A across a longitudinal axis of the housing 102. In such embodiments, the housing 102 may be symmetrical about the longitudinal axis. In some embodiments, the integral cover plate 104 may include a number of latches equal to a number of receptacles of the housing 102. For example, if the housing 102 includes a first receptacle 110A and a second receptacle, the integral cover plate 104 includes a first latch and a second latch. Any suitable number of corresponding latches and receptacles may be employed, as the present disclosure is not so limited.

Figure 2:
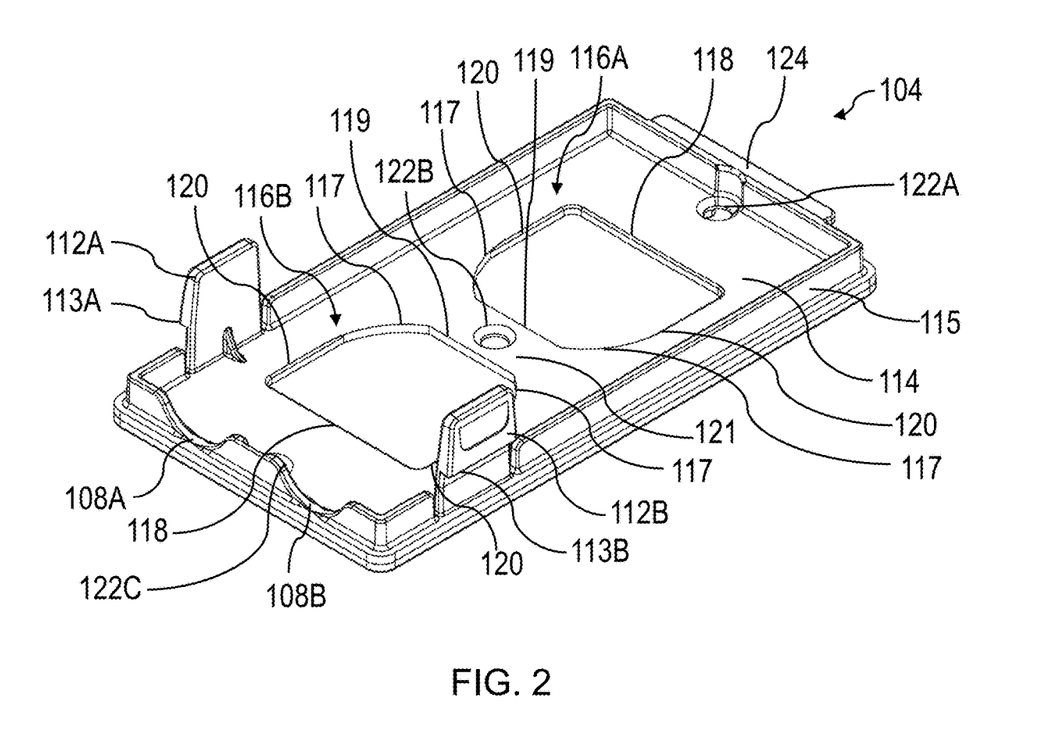
FIG. 2 is a perspective view of one embodiment of an integral cover plate.

FIG. 2 is a perspective view of one embodiment of an integral cover plate 104 with a corresponding housing (see housing 102 in FIG. 1) removed. As shown in FIG. 2, the integral cover plate 104 includes a first latch 112A and a second latch 112B. The first latch 112A and the second latch 112B are disposed on opposing sides of the integral cover plate 104. The first latch 112A includes a first shelf 113A and the second latch 112B includes a second shelf 113B. According to the embodiment of FIG. 2, the first shelf 113A and the second shelf 113B are both configured to engage a receptacle of a housing. In particular, the first shelf 113A and the second shelf 113B are both configured to abut a receptacle wall of a housing to releasably attach the housing to the integral cover plate 104. In some embodiments, the first latch 112A and the second latch 112B are configured to elastically flex between an engaged and disengaged position. In some embodiments, the first latch 112A and the second latch 112B are configured to be moved from the engaged position to the disengaged position as a housing is moved toward the integral cover plate 104. For example, a portion of each of the first latch 112A and the second latch 112B may be inclined such that engaged of the inclined portion with the housing moves each latch to the disengaged position. Once the housing is in a position where the first latch 112A and the second latch 112B are aligned with corresponding receptacles of the housing, the first latch 112A and the second latch 112B may move from the disengaged position to the engaged position automatically. In some embodiments, the elasticity of the first latch 112A and the second latch 112B may bias the first latch 112A and the second latch 112B to the engaged position. In some embodiments as shown in FIG. 2, the integral cover plate 104 may include a tab 124 that is configured to be received in a slot formed in a housing. The tab 124 may function as a hinge to allow the housing to be reliably aligned with the integral cover plate 104 such that the latches 112A, 112B are aligned with corresponding receptacles on the housing. In other embodiments no tab 124 may be included, as the present disclosure is not so limited.

As shown in FIG. 2, the integral cover plate 104 includes a first cutout 116A and a second cutout 116B. The first cutout 116A and second cutout 116B are formed in a flat plate 114. The first cutout 116A and second cutout 116B have the same shape, except that that second cutout 116B is rotated 180 degrees compared to the first cutout 116A. Each of the first cutout 116A and the second cutout 116B includes a first base 118 and a second base 119. Additionally, each of the first cutout 116A and the second cutout 116B includes two sidewalls interconnecting the first base and the second base. For the purposes of sequential numbering, the first base 118 and the second base 119 of the second cutout 116B may be considered a third base and a fourth base, respectively. In some embodiments as shown in FIG. 2, the sidewalls 120 include curved portions 117. A curved portion 117 may connect a straight portion of a sidewall 120 to one of the first base 118 and the second base 119. As shown in FIG. 2, the first base 118 may have a greater than a length of the second base 119. Correspondingly, the second base 119 may have a length shorter than that of the first base 118. In some embodiments, the first bases 118 of both the first cutout 116A and the second cutout 116B may be equal in length. In some embodiments, the second bases 119 of both the first cutout 116A and the second cutout 116B may be equal in length. According to the embodiment of FIG. 2, the arrangement of the first outlet cutout 116A and the second outlet cutout 116B is configured to allow the integral cover plate 104 to engage both a standard outlet and a decorative outlet without additional components. As will be discussed further with reference to FIGS. 5-6, the first outlet cutout 116A and the second outlet cutout 116B are configured to engage sockets of a standard outlet or decorative outlet. In some embodiments, the first bases 118 are configured to engage with a portion of a decorative outlet, and both the first bases 118 and the second bases 119 are configured to engage with portion of a standard outlet. In some embodiments, the integral cover plate 104 is configured to bend to allow the first bases 118 to engage with the portion of the decorative outlet. Such an exemplary arrangement will be discussed further with reference to FIGS. 4-5.

According to the embodiment of FIG. 2, the integral cover plate 104 includes a first mounting hole 122A, a second mounting hole 122B, and a third mounting hole 122C. The mounting holes are formed in the flat plate 114. In some embodiments as shown in FIG. 2, the mounting holes may be countersunk. As shown in FIG. 2, the first mounting hole 122A is disposed at a top portion of the integral cover plate 104. The second mounting hole 122B is formed in a crossbeam 121 of the flat plate 114 that separates the first cutout 116A from the second cutout 116B. the third mounting hole 122C is disposed in a bottom portion of the integral cover plate 104. The three mounting holes 122A, 122B, 122C are configured to receive fasteners such as screws, bolts, etc. The mounting holes are configured to allow the integral cover plate 104 to be mounted to an existing outlet that is either standard or decorative. Standard outlets may include a single fastening point in a center of the outlet, which may be engaged by a fastener disposed through the second mounting hole 122B. Decorative outlets may include a top fastening point and a bottom fastening point, which may be engaged by fasteners disposed through the first mounting hole 122A and the third mounting hole 122C, respectively. In some embodiments, the mounting holes 122A, 122B, 122C may be configured to receive existing cover plate fasteners associated with an existing outlet. In other embodiments different fasteners from those pre-existing may be employed, as the present disclosure is not so limited.

In some embodiments as shown in FIG. 2, the integral cover plate 104 includes a peripheral wall 115 extending along a periphery of the integral cover plate 104. The peripheral wall 115 is configured to engage an inner wall of a housing. Such engagement assists in aligning the housing with the integral cover plate 104 to releasably attach the housing to the integral cover plate 104. As shown in FIG. 2, the first cover channel 108A and the second cover channel 108B may be formed through the peripheral wall 115 to allow for power cables to exit an interior volume of the housing. In other embodiments no peripheral wall may be included on an integral cover plate 104, as the present disclosure is not so limited.

Figure 3:
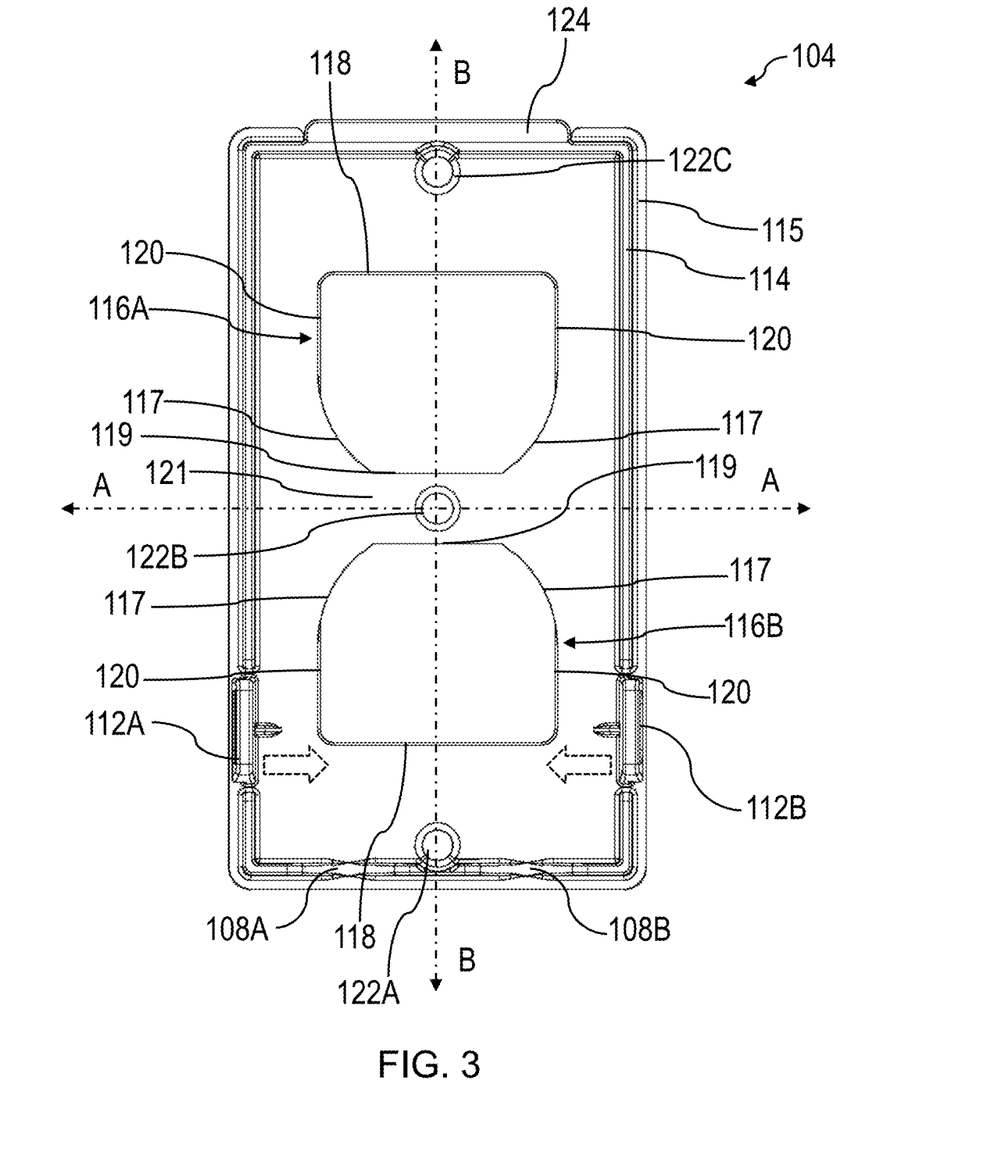
FIG. 3 is a front view of the integral cover plate of FIG. 2.

FIG. 3 is a front view of the integral cover plate 104 of FIG. 2. As shown in FIG. 3, central horizontal axis A and a central vertical axis B of the integral cover plate 104 are shown. The central horizontal axis is aligned with and parallel to the crossbeam 121. As shown in FIG. 3, the first outlet cutout 116A and the second outlet cutout 116B are disposed symmetrically across the central horizontal axis A. In some embodiments, the second outlet cutout 116B is a reflection of the first outlet cutout 116A over the central horizontal axis A (e.g., an axis parallel to the crossbeam 121). As shown in FIG. 3, in some embodiments the integral cover plate 104 may be symmetrical across the central vertical axis B.

In some embodiments as shown in FIG. 3, the first latch 112A and the second latch 112B are configured to elastically flex between an engaged position (shown in FIG. 3) and a disengaged position. In some embodiments as shown in FIG. 3, the first latch 112A and the second latch 112B may be move in opposite directions between the engaged position and the disengaged position. As shown by the dashed arrows, the first latch 112A and the second latch 112B may move inward toward the central vertical axis B when the first latch 112A and the second latch 112B move to the disengaged position. Accordingly, a user may squeeze both the first latch 112A and the second latch 112B at the same time to disengaged both latches, in some embodiments.

Figure 4:
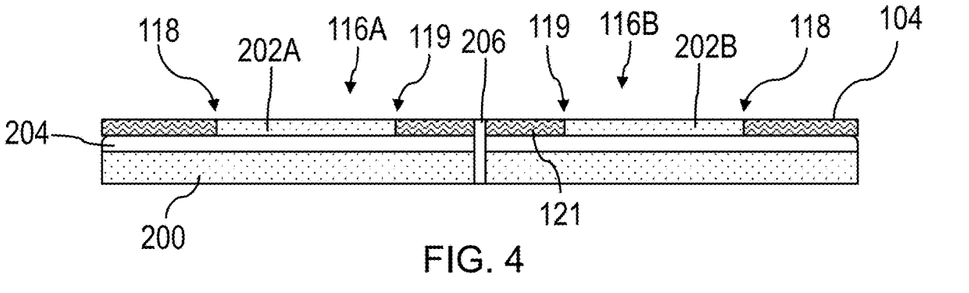
FIG. 4 is a side schematic of an integral cover plate according to exemplary embodiments herein installed on a standard outlet.

FIG. 4 is a side schematic of an integral cover plate 104 according to exemplary embodiments herein installed on a standard outlet 200. As shown in FIG. 4, the standard outlet 200 includes a first socket 202A and a second socket 202B. The first socket 202A and the second socket 202B are separate from one another. As shown in FIG. 4, the standard outlet 200 may also include a standard face plate 204 surrounding the first socket 202A and the second socket 202B. As shown in FIG. 4, in some embodiments the first socket 202A and the second socket 202B may protrude slightly past the face plate 204. As shown in FIG. 4, an integral cover plate 104 is secured to the standard outlet 200 with a fastener 206 (e.g., a screw), which may be received through a mounting hole of the integral cover plate 104. As shown in FIG. 4, the integral cover plate 104 includes a first cutout 116A and a second cutout 116B. The first cutout 116A includes a first base 118 and a second base 119. Likewise, the second cutout 116B includes a first base 118 (e.g., a third base) and a second base 119 (e.g., a fourth base). As shown in FIG. 4, when the integral cover plate 104 is attached to the standard outlet 200, the first bases 118 and the second bases engage with the first socket 202A and the second socket 202B. Specifically, the first bases 118 and the second bases 119 abut the first socket 202A and the second socket 202B.

Figure 5:
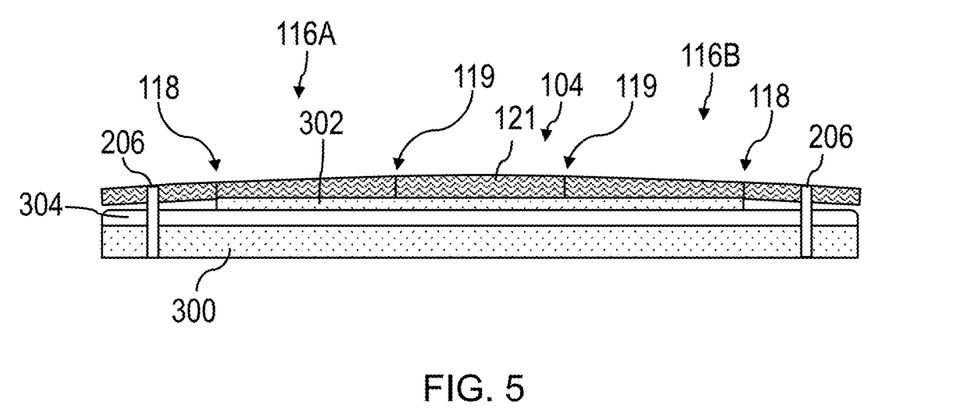
FIG. 5 is a side schematic of an integral cover plate according to exemplary embodiments herein installed on a decorative outlet.

FIG. 5 is a side schematic of an integral cover plate 104 according to exemplary embodiments herein installed on a decorative outlet 300. The integral cover plate 104 may be the same as the integral cover plate of FIG. 5, in some embodiments. As shown in FIG. 5, the decorative outlet 300 includes a socket panel 302, which may include two sockets (not shown). The socket panel 302 of the decorative outlet 300 may be rectangular. As shown in FIG. 5, the decorative outlet 300 may also include a decorative face plate 304 surrounding the socket panel 302. As shown in FIG. 5, in some embodiments the socket panel 302 may protrude slightly past the face plate 304. As shown in FIG. 5, an integral cover plate 104 is secured to the decorative outlet 300 with two fasteners 206 (e.g., screws), which may be received through mounting holes (e.g., top and bottom mounting holes) of the integral cover plate 104. In some embodiments as shown in FIG. 5, the presence of a crossbeam 121 of the integral cover plate 104 stops the integral cover plate from receiving the outlet panel 302. In some embodiments, the integral cover plate 104 is configured to bend to allow the integral cover plate 104 to partially receive the outlet panel 302. In particular, as the fasteners 206 are tightened, the integral cover plate 104 may bend such that the first base 118 of each cutout 116A, 116B engages the outlet pane 302. In this manner, the same integral cover plate 104 may be employed with both standard and decorative outlets without additional components. In other embodiments, an integral cover may sit flush with the outlet panel 302 without bending, as the present disclosure is not so limited.

It should be noted that while face plates are shown and described with reference to the embodiments of FIGS. 4-5, in other embodiments no face plate may be employed on an outlet. In some such embodiments, an integral cover plate may replace a pre-existing face plate while preserving the functionality described with reference to FIG. 4 and FIG. 5. Additionally, in some embodiments an outlet panel or outlet socket may not protrude from an outlet face plate, as the present disclosure is not so limited. In some such embodiments, an integral outlet cover may sit flush with the existing outlet face plate.

Figure 6:
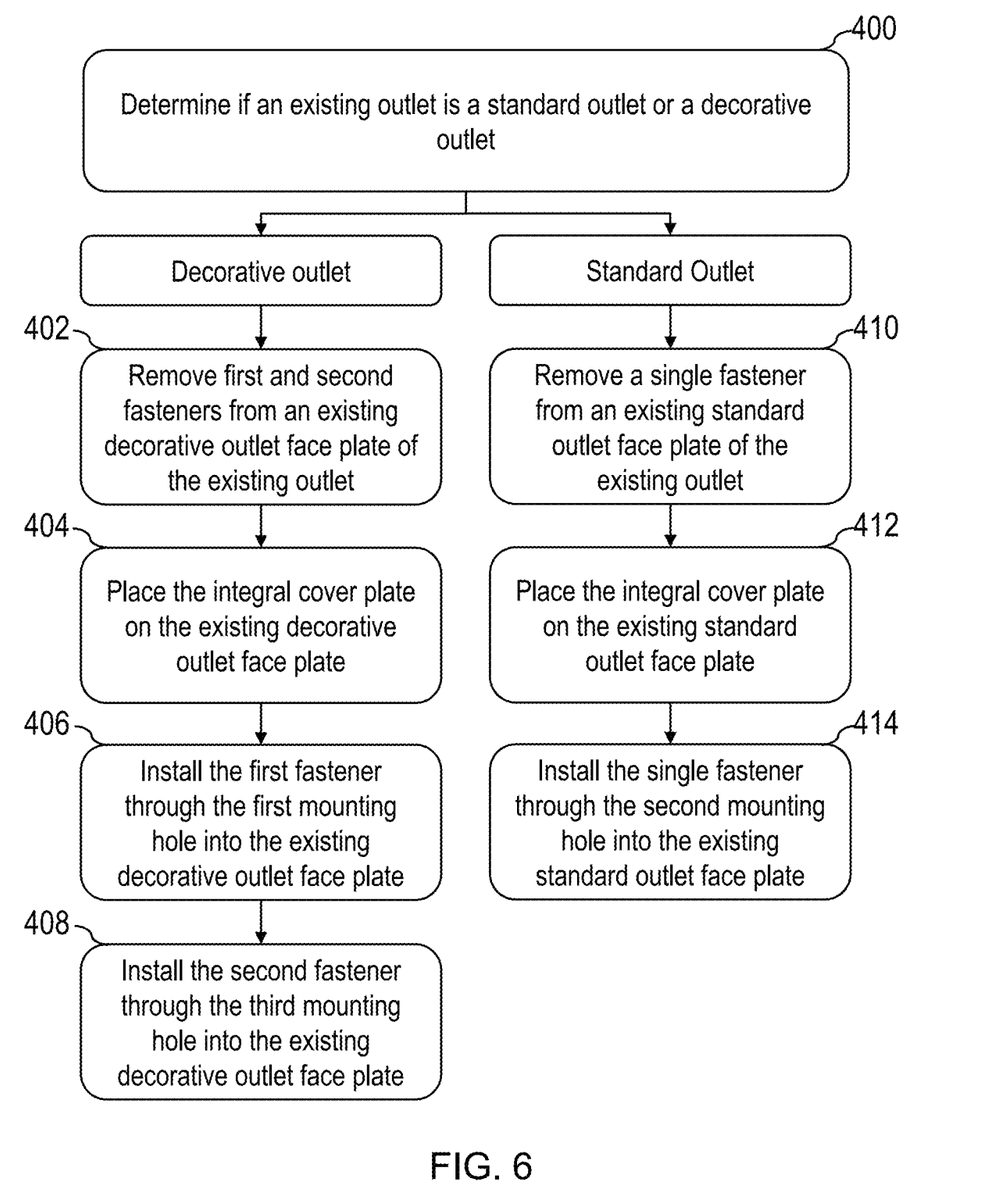
FIG. 6 is a flow chart for one embodiment of a method of installing an outlet cover according to exemplary embodiments described herein.

FIG. 6 is a flow chart for one embodiment of a method of installing an outlet cover according to exemplary embodiments described herein. In block 400, the method includes determining if an existing outlet is a standard outlet or a decorative outlet. If it is determined that the outlet is a decorative outlet, in block 402 the method may include removing first and second fasteners from an existing decorative outlet face plate of the existing outlet. In block 404, the method includes placing the integral cover plate on existing decorative outlet face plate. In block 406, the method includes installing the first fastener through the first mounting hole into the exiting decorative outlet face plate. In block 408, the method includes installing the second fastener through the third mounting hole into the existing decorative outlet face plate. If it is determined that the outlet is a standard outlet, in block 410 the method includes removing a single fastener from an existing standard outlet face plate of the existing outlet. In block 412, the method includes placing the integral cover plate on the existing standard outlet face plate. In block 414, the method includes installing the single fastener through the second mounting hole into the existing standard outlet face plate.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed:

1. An outlet cover comprising:
    an integral cover plate comprising:
    a first outlet cutout comprising a first base, a second base, and two sidewalls interconnecting the first base and the second base, wherein the second base has a length shorter than the first base,
    a second outlet cutout comprising a third base, a fourth base, and two sidewalls interconnecting the third base and the fourth base, wherein the fourth base has a length shorter than the third base,
    a crossbeam separating the first outlet cutout from the second outlet cutout,
    a first mounting hole formed in a top portion of the integral cover plate, a second mounting hole formed in the crossbeam,
a third mounting hole formed in a bottom portion of the integral cover plate, and
at least one latch configured to move between a disengaged position and an engaged position; and
a housing configured to releasably attach to the integral cover plate, wherein the housing comprises at least one receptacle configured to receive the at least one latch when the at least one latch is in the engaged position.

2. The outlet cover of claim 1, wherein the two sidewalls of the first outlet cutout each comprise a curved portion, and wherein the two sidewalls of the second outlet cutout each comprise a curved portion.

3. The outlet cover of claim 1, wherein the first base and the third base are equal in length, and wherein the second base and the fourth base are equal in length.

4. The outlet cover of claim 1, wherein the second outlet cutout is a reflection of the first outlet cutout over an axis parallel to the crossbeam.

5. The outlet cover of claim 1, wherein the at least one latch is two latches, and wherein the at least one receptacle is two receptacles.

6. The outlet cover of claim 1, wherein the at least one latch is configured to elastically flex between the engaged position and the disengaged position.

7. The outlet cover of claim 1, wherein the integral cover plate further comprises a flat plate, wherein the crossbeam forms a portion of the flat plate, and wherein the first outlet cutout, second outlet cutout, first mounting hole, second mounting hole, and third mounting are formed in the flat plate.

8. The outlet cover of claim 1, wherein the integral cover plate is formed of plastic.

9. The outlet cover of claim 8, wherein the integral cover plate is integrally molded.

10. The outlet cover of claim 1, wherein the integral cover plate further comprises a peripheral wall extending along a periphery of the integral cover plate, wherein the peripheral wall is configured to engage an inner wall of the housing.

11. The outlet cover of claim 1, wherein the first base is configured to engage with a portion of a decorative outlet, and wherein the first base and the second base are configured to engage with portions of a standard outlet.

12. The outlet cover of claim 11, wherein the integral cover plate is configured to bend to allow the first base to engage with the portion of the decorative outlet.

13. A method of installing an integral cover plate, the integral cover plate comprising a crossbeam separating a first outlet cutout from a second outlet cutout, a first mounting hole formed in a top portion of the integral cover plate, a second mounting hole formed in the crossbeam, and a third mounting hole formed in a bottom portion of the integral cover plate, the method comprising:

when the existing outlet is the standard outlet:
removing a single fastener from an existing standard outlet face plate of the existing outlet,
placing the integral cover plate on the existing standard outlet face plate, and
installing the single fastener through the second mounting hole into the existing standard outlet face plate; and
when the existing outlet is the decorative outlet:
removing a first fastener and a second fastener from an existing decorative outlet face plate of the existing outlet,
placing the integral cover plate on the existing decorative outlet face plate,
installing the first fastener through the first mounting hole into the existing decorative outlet face plate, and
installing the second fastener through the third mounting hole into the existing decorative outlet face plate.

14. The method of claim 13, wherein placing the integral cover plate on the standard outlet comprises:
aligning the first outlet cutout of the integral cover plate with a first socket of the standard outlet, wherein the first outlet cutout comprises a first base, a second base, and two sidewalls interconnecting the first base and the second base, wherein the second base has a length shorter than the first base; and
aligning the second outlet cutout of the integral cover plate with a second socket of the standard outlet, wherein the second outlet cutout comprising a third base, a fourth base, and two sidewalls interconnecting the third base and the fourth base, wherein the fourth base has a length shorter than the third base.

15. The method of claim 14, wherein placing the integral cover plate on the existing decorative outlet face plate comprises bending the integral cover plate to bend to allow the first base to engage with the decorative outlet.

16. The method of claim 13, further comprising releasably attaching a housing to the integral cover plate.

17. The method of claim 16, wherein releasably attaching the housing to the integral cover plate comprises:
moving at least one latch of the integral cover plate from an engaged position to a disengaged position as the housing is moved toward the integral cover plate; and
moving the at least one latch from the disengaged position to the engaged position to engage at least one receptacle of the housing.

18. The method of claim 17, wherein the at least one latch is two latches, and wherein the at least one receptacle is two receptacles.

19. The method of claim 13, wherein the integral cover plate is formed of plastic.

20. The method of claim 19, wherein the integral cover plate is integrally molded.

* * * * *